United States Patent
Put et al.

[11] Patent Number: 5,872,758
[45] Date of Patent: Feb. 16, 1999

[54] METHOD OF MANUFACTURING TAPE-LIKE INFORMATION CARRIERS AND A WEB-LIKE INTERMEDIATE CARRIER

[75] Inventors: Paul L. M. Put; Henricus F. J. J. Van Tongeren; Marinus J. J. Dona; Petrus J. H. Van Dooren, all of Eindhoven, Netherlands

[73] Assignee: U.S. Philips Corporation, New York, N.Y.

[21] Appl. No.: 427,394

[22] Filed: Apr. 24, 1995

[30] Foreign Application Priority Data

Jul. 28, 1994 [EP] European Pat. Off. ............. 94202205

[51] Int. Cl.$^6$ ........................................... G11B 7/00
[52] U.S. Cl. ................... 369/85; 369/84; 369/97; 360/15
[58] Field of Search ................... 369/84, 85, 47, 369/48, 54, 58, 97, 96, 93; 360/15, 13, 16, 17

[56] References Cited

U.S. PATENT DOCUMENTS

4,882,637 11/1989 Duurland et al. .................... 360/16
5,563,867 10/1996 Gregg .................................. 369/85

FOREIGN PATENT DOCUMENTS

5-114172 5/1993 Japan .

Primary Examiner—Muhammad N. Edun
Attorney, Agent, or Firm—Ernestine C. Bartlett

[57] ABSTRACT

A method of manufacturing a prerecorded tape (9), the master taking the form of a helical pattern (13) on a cylinder (10). This cylinder (10) is rolled over a web-like intermediate carrier (1), the pattern (13) being replicated in strips (5) by a contact between the cylinder (10) and the intermediate carrier (1), which strips extend at an acute angle ($\alpha$) relative to the longitudinal direction (3) of the intermediate carrier (1). The intermediate carrier (1) is cut along the strips (5) to form tapes (9).

18 Claims, 4 Drawing Sheets

METHOD OF MANUFACTURING TAPE-LIKE INFORMATION CARRIERS AND A WEB-LIKE INTERMEDIATE CARRIER

FIELD OF THE INVENTION

The invention relates to a method of manufacturing tape-like information carriers, comprising the following steps: forming a helical pattern on a circumferential surface of a cylinder, and bringing the circumferential surface of the cylinder into contact with a main surface of a web-shaped intermediate carrier with a longitudinal direction, in order to replicate the pattern on the intermediate carrier in the form of continuous strips, which strips extend at an acute angle relative to the longitudinal direction.

The invention also relates to a web-like intermediate carrier with a longitudinal direction, comprising strips which extend at an acute angle relative to the longitudinal direction.

The invention also relates to an arrangement for cutting a web-like intermediate carrier with a longitudinal direction, which arrangement comprises cutting means adapted to simultaneously cut the web-like intermediate carrier into a plurality of tape-like portions at different cutting positions.

The invention also relates to a tape-like information carrier.

The invention also relates to a cassette provided with a tape-like information carrier.

BACKGROUND OF THE INVENTION

Such a method is known from JP-A-5-114,172. The known method serves for the manufacture of optical tape. Said method employs a cylinder of circular cross-section, the surface of the cylinder being formed with a matrix consisting of a pattern in the form of circles or a helix, which pattern comprises a structure of equispaced ridges and slots. This cylinder is pressed in a heated condition against an optical information carrier which at its side facing the cylinder carries a layer made up of a mixture of photopolymerizable molecules and a resin. At the same time this layer is irradiated with light to form the structure in the layer by means of a photoreaction. This method is proposed in order to form an optical information carrier with a pattern of guide tracks for a rotating optical read head. For this purpose, the ridges and slots extend at an acute angle relative to the longitudinal direction of the optical information carrier. The known method is not suitable for the production of large quantities of so-called prerecorded carriers for information such as movies, music or computer data.

SUMMARY OF THE INVENTION

It is an object of the invention to extend a method of the type defined in the opening paragraph in such a manner that it is suitable for the production of large quantities of information carriers carrying large amounts of coded information.

The method in accordance with the invention is characterized in that the pattern comprises a first structure with coded information, a second structure is formed in each of the strips, which second structure is a replica of the first structure, and the intermediate carrier is cut parallel to the strips so as to form tape-like information carriers. This method has the advantage that the information carrier can be provided with a very large amount of coded information. An additional advantage of this method is that as many second structures are formed in parallel as there are turns of the helix although only one first structure has to be formed. This renders the method suitable for the production in large quantities of information carriers provided with large amounts of information. This method enables, for example, tape-like information carriers provided with coded information and having a width of 8 millimeters and a length of 100 meters to be made with the aid of a cylinder having a diameter of approximately 30 centimeters and a width of 80 centimeters.

It is to be noted that U.S. Pat. No. 4,882,637 (PHQ 87015) describes another known method of manufacturing tape-like information carriers. Said method uses a tape-like matrix having a structure with coded information, which is pressed against a carrier to copy the structure onto the carrier. A drawback of this method is that only one copy at a time can be made of each original.

A variant of the method in accordance with the invention is characterized in that the pattern is formed on the cylinder by means of a write head while the cylinder is rotated relative to the write head about an axis and the write head is moved relative to the cylinder in a direction parallel to the axis. The write head could also form a first structure on a tape-like matrix, which could subsequently be wound onto the cylinder as a helix. However, the present variant of the method has the advantage that it provides a matrix which can be handled satisfactorily without a difficult-to-handle tape-like matrix having to be made, which should subsequently be fitted onto the cylinder as a helix. Moreover, the circumferential surface is as smooth as possible, which enables a uniform contact with the intermediate carrier to be achieved.

A variant of the method in accordance with the invention is characterized in that the second structure takes the form of an optically readable structure. By means of this measure it is possible to obtain a high information density on the information carrier and to effect reading without mechanical contact.

A variant of the method in accordance with the invention is characterized in that the positions of the strips relative to the cutting positions are measured during cutting, and in that the measurement result is used for the correction of these positions. With these measures very long intermediate carriers can be processed in one operation without tolerances in the equipment and the intermediate carrier giving rise to impermissible deviations of the positions of the structure relative to the edges of the tape-like information carriers.

A variant of the method in accordance with the invention is characterized in that correction is effected by controlling the tension in the intermediate carrier. By varying the tension in the intermediate carrier the angle of the strips relative to the longitudinal direction of the intermediate carrier can be adapted to the cutting angle of the intermediate carrier by elastic deformation of the intermediate carrier. This measure provides a simple way of correcting the positions of the strips relative to the cutting positions.

The intermediate carrier in accordance with the invention is characterized in that the strips have mutually identical second structures containing coded information. Such an intermediate carrier has a large number of mutually identical second structures and is therefore very suitable for storing and transferring these second structures, particularly if the replicas are made at a first location and the tape-like information carriers are loaded into a cassette at a second location.

An embodiment of the intermediate carrier in accordance with the invention is characterized in that the acute angle is smaller than 5 degrees. As a result of this, the strips are long in proportion to the width of the intermediate carrier, so that the strips can accommodate a large amount of information with a suitable width of the intermediate carrier.

An embodiment of the intermediate carrier in accordance with the invention is characterized in that the second structure is optically readable. By means of this measure it is achieved that the second structure can have a high information density.

The arrangement in accordance with the invention is characterized in that the cutting positions are movable relative to the web-like intermediate carrier along a line which extends at an acute angle relative to the longitudinal direction of the web-like intermediate carrier. Such an arrangement is suitable for cutting the intermediate carrier by means of the method described above.

An embodiment of the arrangement in accordance with the invention is characterized in that the acute angle is smaller than 5 degrees.

An embodiment of the arrangement in accordance with the invention is characterized in that the cutting means comprise a helical cutter. This measure ensures that the cutting positions automatically travel along a line extending at an acute angle relative to the longitudinal direction of the intermediate carrier by rolling the helical cutter over the intermediate carrier.

An embodiment of the arrangement in accordance with the invention is characterized in that the cutting means comprise two helical cutters which are positioned opposite one another and which are adapted to cooperate with one another in the same way as the blades of a pair of scissors. By means of this measure it is achieved that the forces on the intermediate carrier are concentrated in an area directly around the cutting positions, thereby reducing the likelihood of damage to the second structure.

An embodiment of the arrangement in accordance with the invention is characterized in that one of the helical cutters is capable of resilient deflection in a direction parallel to the axis of the helix. This measure ensures that even in the case of small deviations of the cutter dimensions the two cutters interengage at all the cutting positions.

An embodiment of the arrangement in accordance with the invention is characterized in that the arrangement includes a transport device for the transport of the web-shaped intermediate carrier parallel to its longitudinal direction, the cutting means comprise a plurality of cutting heads, which cutting heads are movable in a direction of movement perpendicular to the longitudinal direction. This measure allows the use of existing cutting heads such as razor blades.

An embodiment of the arrangement in accordance with the invention is characterized in that the cutting heads comprise a laser cutting head. This embodiment has the advantage that hardly any forces are produced in the plane of the web-shaped intermediate carrier as a result of cutting. This enables the position of the intermediate carrier relative to the cutting positions to be controlled more effectively.

An embodiment of the arrangement in accordance with the invention is characterized in that the arrangement includes measurement means for measuring the position of the second structure on the intermediate carrier relative to the cutting positions, which measurement means cooperate with control means for the correction of said position. These measures allow very long intermediate carriers to be processed in a single operation without tolerances of the arrangement or the intermediate carrier leading to impermissible deviations of the positions of the second structure relative to the edges of the tape-like information carriers.

An embodiment of the arrangement in accordance with the invention is characterized in that the control means are adapted to control the tension in the web-like intermediate carrier. Varying the tension in the intermediate carrier results in elastic deformation of the intermediate carrier. Thus, the angle of the strips relative to the longitudinal direction can be influenced so as to adapt this angle to the angle at which the intermediate carrier is cut.

BRIEF DESCRIPTION OF THE DRAWINGS

The invention will now be described in more detail, by way of example, with reference to the drawings, in which.

It is to be noted that the embodiments are shown diagrammatically and the Figures are shown to an arbitrary scale, which is not always the same.

DETAILED DESCRIPTION OF THE PREFERRED EMBODIMENTS

Figure 1:
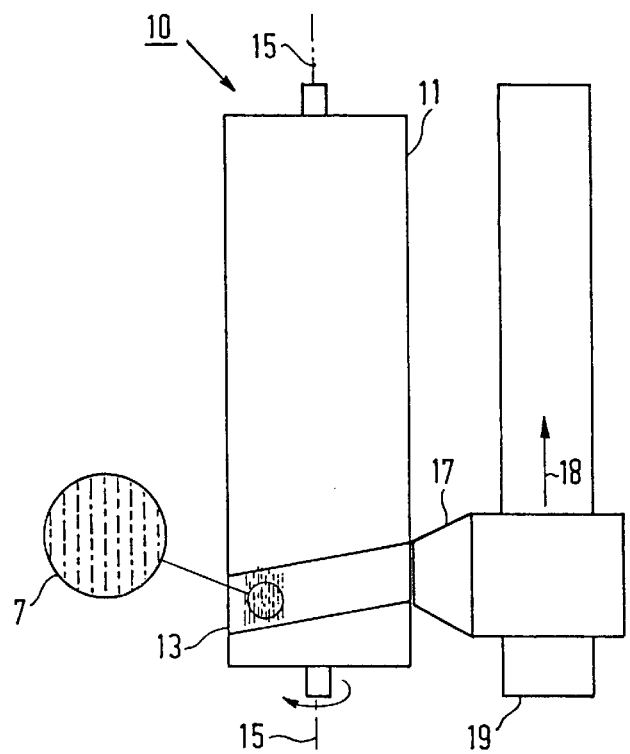
FIG. 1 is a side view showing an arrangement for forming a first structure on a cylinder to be used in the method in accordance with the invention.

FIG. 1 is a side view showing an arrangement for forming a first structure 7 on a cylinder 10. The first structure 7 is formed on the cylinder 10 in a helical pattern 13 by means of a write head 17. For this purpose the cylinder 10 is rotated about its axis 15 and the write head 17 is moved along the guide member 19 in a direction 18 parallel to the axis 15. The write head 17 writes a first structure 7 on a circumferential surface 11 of the cylinder 10, for example by means of a laser (not shown). To define this structure 7 the circumferential surface 11 of the cylinder 10 is coated with a photoresist. The laser brings about a chemical reaction in this photoresist layer. Upon development of this layer the material at the location irradiated by the laser remains intact and the other material is removed. This results in a first structure 7 of projections on the cylinder 10. This first structure 7 contains coded information, for example in the form of the lengths and positions of the projections. The photoresist can be applied to the cylinder 10, for example, by dip-coating. By means of the write head 17 it would also be possible to form a first structure 7 on a tape-like matrix, which is subsequently wound onto the cylinder 10 as a helix. However, the method just described has the advantage that it provides a matrix which is convenient to handle without a difficult-to-handle tape-like matrix being required. Another advantage of this method is that no irregularities arise at the location where the turns of the helix adjoin one another.

Figure 2:
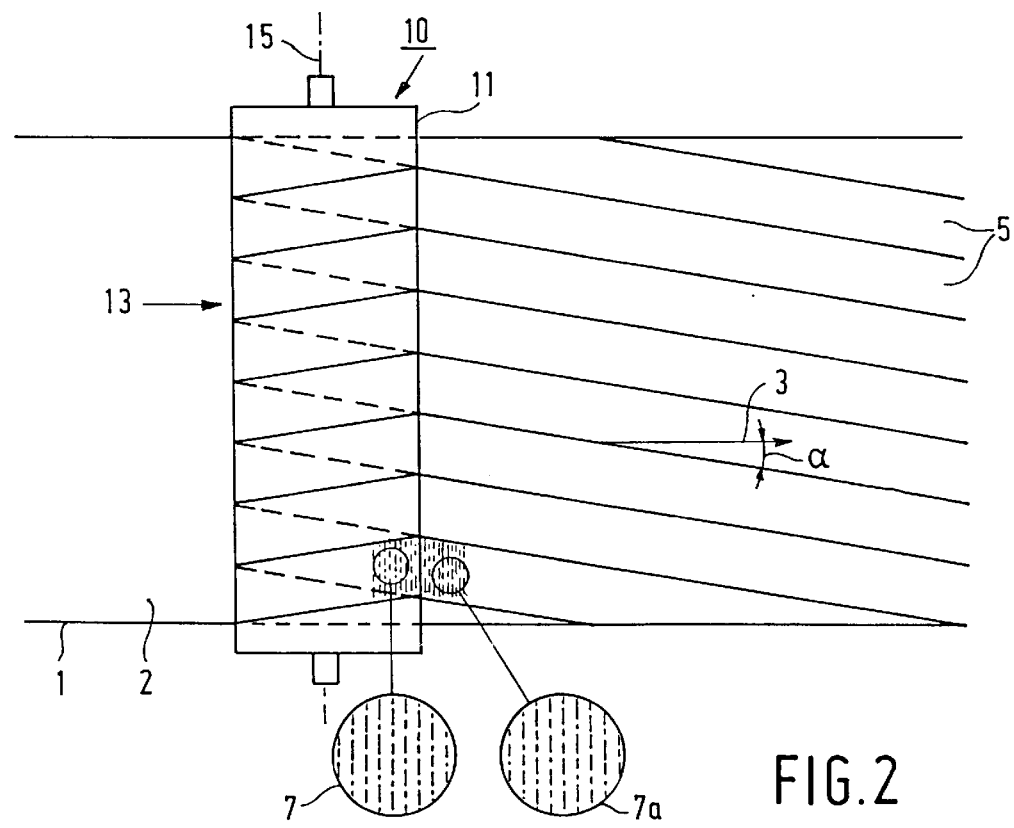
FIG. 2 is a plan view of an arrangement for replicating the first structure on a web-like intermediate carrier.

FIG. 2 is a plan view showing an arrangement for replicating the first structure 7 on the cylinder 10 onto a web-like intermediate carrier 1. In this arrangement the intermediate carrier 1 is brought into contact with the circumferential surface 11 of the cylinder 10. In this process the cylinder 10 is rolled over the intermediate carrier 1, the latter being moved in its longitudinal direction 3. Thus, the helical pattern 13 is copied onto the intermediate carrier 1 in strips 5, a second structure 7a being formed in each of the strips 5, which second structure is a replica of the first structure 7. The strips 5 with the structures 7a are formed at an acute angle α relative to the longitudinal direction 3 of the intermediate carrier 1.

Figure 3:
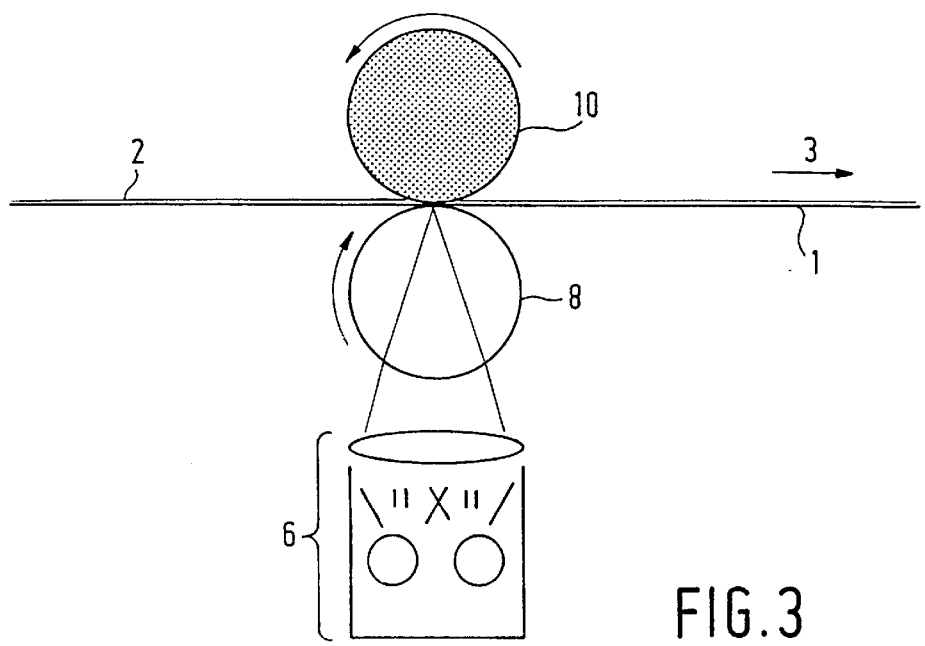
FIG. 3 is a sectional view of the arrangement shown in FIG. 2.

FIG. 3 is a side view of the arrangement for copying the first structure 7 on the intermediate carrier 1. The intermediate carrier 1 is pressed against the cylinder 10 by a pressure roller 8. The intermediate carrier 1 has a coating 2 of a photopolymerizable material, also referred to as a 2P layer. The 2P layer is disposed on the side of the intermediate carrier 1 which faces the cylinder 10. This 2P layer 2 is readily deformable at room temperature and is curable by means of ultraviolet light. The projections forming the first structure 7 on the cylinder 10 are pressed into the 2P layer 2 and thus form the second structure as a relief structure 7a (see FIG. 2). The relief structure 7a is formed by pits corresponding to the projections of the first structure 7. By means of an exposure arrangement 6 the 2P layer 12 is exposed at the location of contact with the cylinder 10, as a result of which the 2P layer 2 is cured and the first structure 7 is replicated in the 2P layer 2 as the relief structure 7a.

After this, the intermediate carrier 1 may be provided with a reflective coating and a protective coating, enabling the relief structure 7a to be read in a reflection mode by means of a suitable read device. Such an optically readable second structure 7a has an enormous information storage capacity per unit area. Since this information is accommodated on a tape an amount of information of the order of magnitude of 100 gigabytes can be stored in a convenient format. In addition, an optically readable second structure 7a has the advantage that reading is possible without mechanical contact. This means that no mechanical contact is necessary between the information carrier 9 and parts of the device with which the information carrier is read. This results in a substantially improved reliability and it also enables the access times to be reduced.

Figure 4:
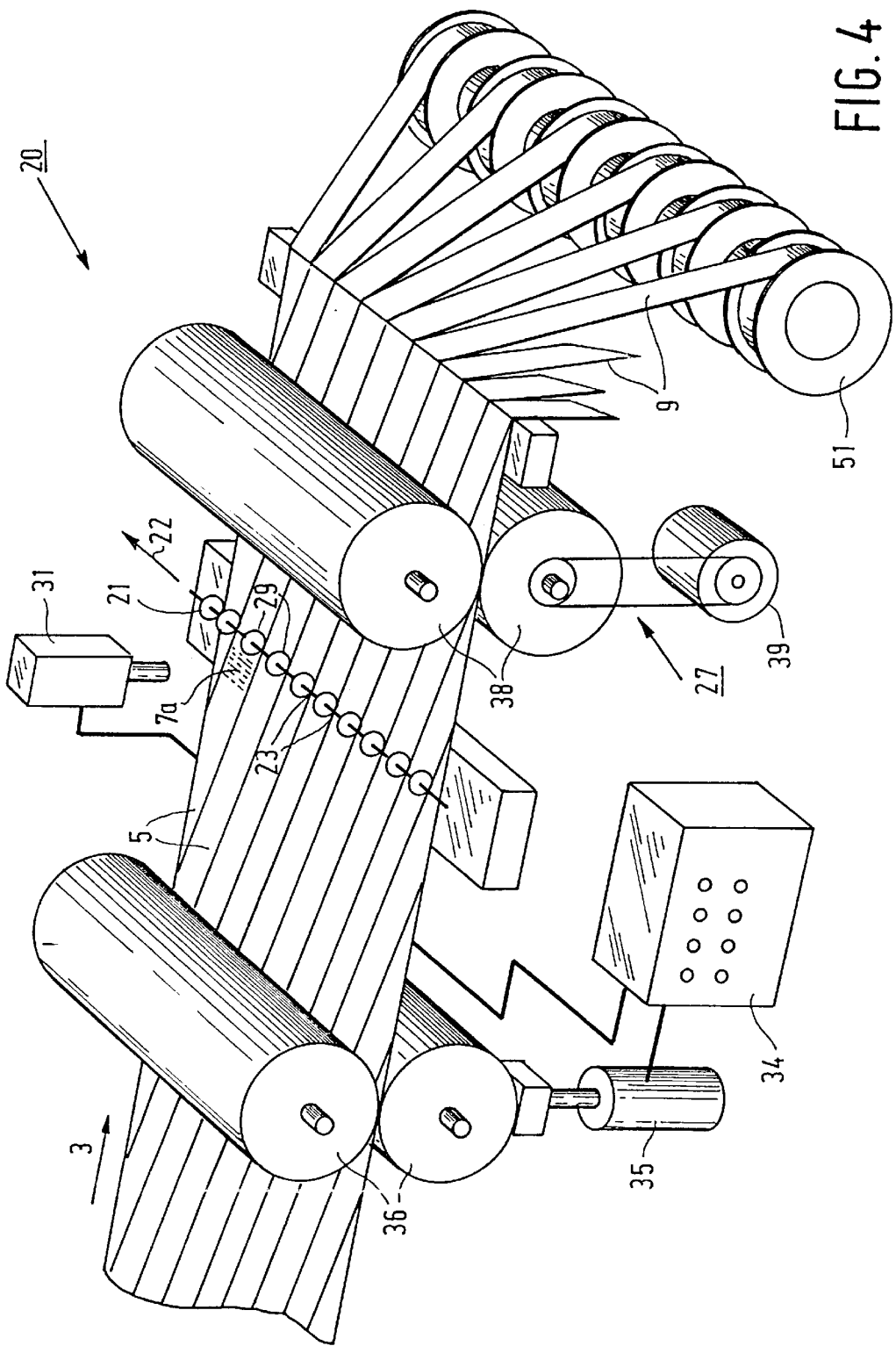
FIG. 4 is a perspective view of an arrangement for cutting a web-like intermediate carrier.

FIG. 4 is a perspective view of an arrangement 20 for cutting the web-like intermediate carrier 1. In this arrangement 20 the intermediate carrier 1 is moved in its longitudinal direction 3 by a transport device 27. The transport device 27 comprises a set of rollers 38 driven by a motor 39. The arrangement 20 further comprises cutting means 21, which in the present case comprise a plurality of rotating cutters 29 which cut the web-like intermediate carrier 1 into tape-like information carriers 9 at cutting positions 23. Cutting is effected parallel to the strips 5 on the intermediate carrier 1. For this purpose the cutting means 23 are moved in a direction of movement 22 perpendicular to the longitudinal direction 3 during transport of the intermediate carrier 1, so that the said cutting means are moved at a cutting angle relative to the intermediate carrier. Each time that a new strip 5 begins a cutter 29 is applied to the intermediate carrier 1 and once this entire strip 5 has been cut the cutter 29 will have reached the other edge of the intermediate carrier 1 and can be raised in order to be positioned at the beginning of a new strip 5. A control system serves to ensure that the second structure 7a on the tape-like information carrier 9 is positioned correctly relative to the edge of the tape-like information carrier. This control system comprises a camera 31 connected to a control unit 34. This control unit 34 measures the position of the second structure 7a relative to the cutting positions 23 by means of image analysis. The control system further includes control means in the form of a pair of braking rollers 36 and a brake 35. During transport of the intermediate carrier 1 in its longitudinal direction 3 the tension in the intermediate carrier 1 can be controlled by means of these braking rollers 36 and the brake 35. The intermediate carrier 1 is made of an elastic resin, for example polyester. This enables the intermediate carrier 1 to be stretched within its elastic range by increasing the tension in the intermediate carrier. When the tension in the longitudinal direction 3 is increased the angle α of the strips 5 relative to the longitudinal direction 3 is reduced. Thus, by controlling the tension around an average value the angle α between the strips 5 and the longitudinal direction 3 can be adapted to the cutting angle realised by the cutting means 21. In response to the information obtained by means of the camera 31 the control unit 34 can control the brake 35 in such a manner that the second structure 7a on the tape-like information carrier is positioned within given tolerances relative to the edge of the information carrier 9. The tape-like information carriers 9 are wound onto reel hubs 51 in the arrangement 20. Subsequently, these reel hubs can be mounted directly in a cassette 50 as shown in FIG. 6.

Figure 5:
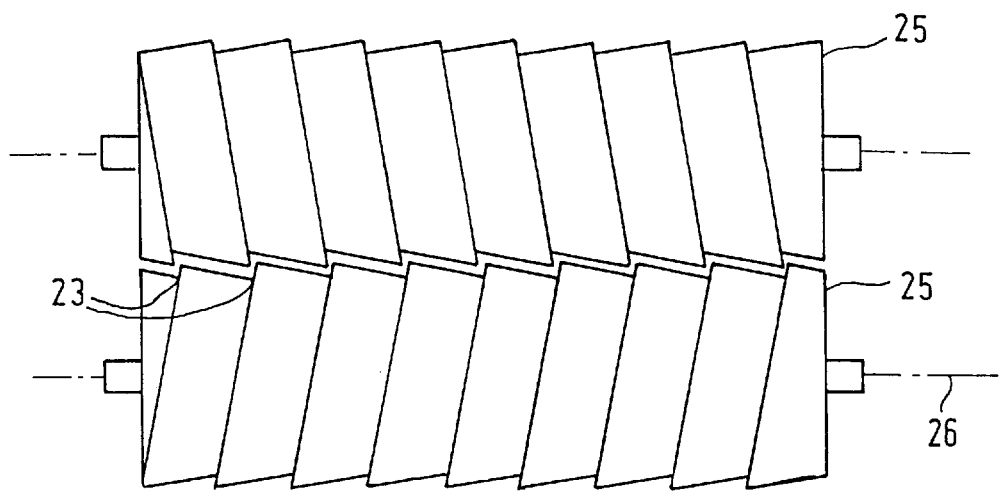
FIG. 5 shows two helical cutters arranged opposite one another.

FIG. 5 shows alternative cutting means 21. These cutting means 21 comprise two helical cutters 25 arranged opposite one another. By making the helical shape of the cutters 25 correspond to the helical shape on the cylinder 10 serving as a matrix for forming replicas 7a on the intermediate carrier 1 the intermediate carrier will be cut automatically at the correct angle α. Even a single helical cutter 25 will yield this advantage. Small deviations of the cutting angle can be corrected by means of the control system described above. The cutters 25 are in shearing engagement with one another at cutting positions 23 in the same way as the blades of a pair of scissors. In this way it is achieved that the forces on the intermediate carrier 1 are concentrated in an area directly around the cutting positions 23, thereby reducing the likelihood of damage to the second structure 7a. Preferably, one of the helical cutters 25 is capable of resilient deflection in the direction of its axis 26. This measures ensures that even in the case of small deviations of the dimensions of the cutters 25 the two cutters interengage at all the cutting positions 23, thus producing a well-defined cut. It is most advantageous if at any cutting position 23 the cutter 25 is capable of resilient deflection independently of the other cutting positions 23.

Figure 6:
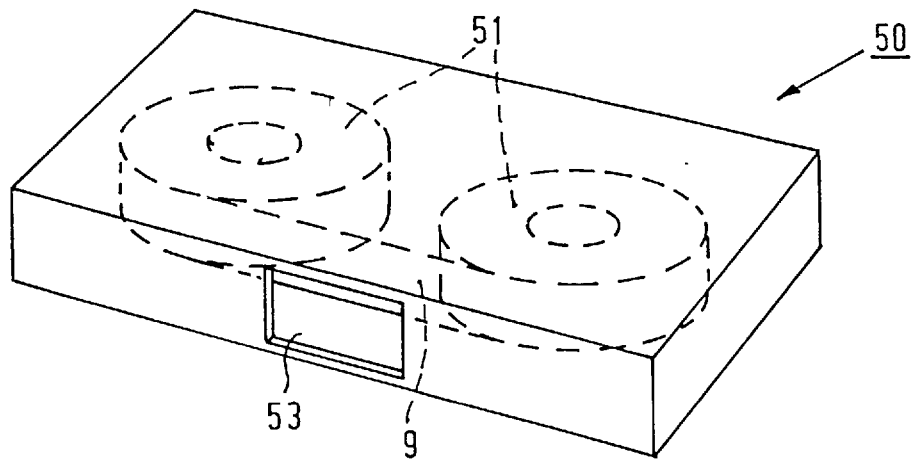
FIG. 6 shows a cassette with a tape-like information carrier.

FIG. 6 is a perspective view showing a cassette 50 provided with a tape-like optical information carrier 9. The information carrier 9 is wound on the reel hub 51 in the cassette 50. The cassette 50 has a window or opening 53 through which the information on the information carrier 9 can be read. Such a cassette 50 has the advantage that the information carrier 9 is effectively protected against the ingress of dust and mechanical damage from the outside.

Figure 7:
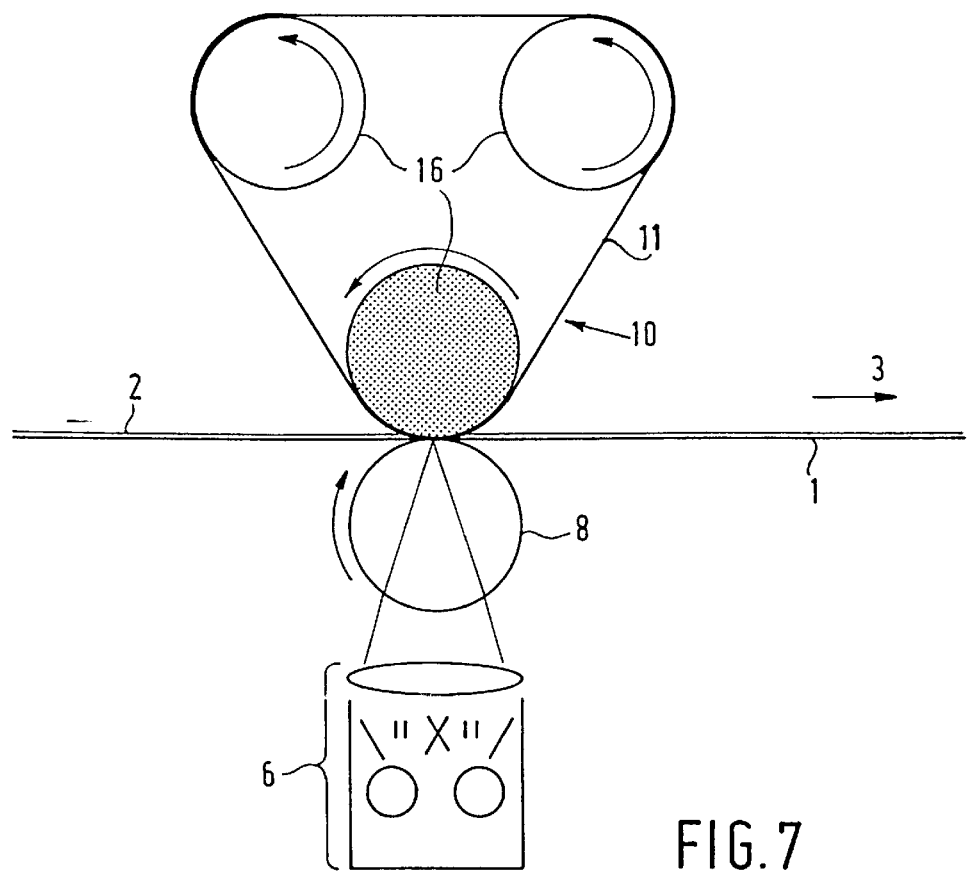
FIG. 7 is a side view showing an alternative arrangement for replicating the first structure on a web-like intermediate carrier.

FIG. 7 is a side view showing an alternative arrangement for replicating the first structure 7 on a web-like intermediate carrier 1. In this arrangement the cylinder 10 with the helical pattern is flexible and is guided over a number of rollers 16. This construction of the cylinder 10 has the advantage that it requires less material with the same area of its circumferential surface 11. As a result of this, its costs are reduced, it is more convenient to handle, and it requires less storage space.

It is to be noted that the invention is not limited to the embodiments disclosed herein. Various other embodiments are possible without departing from the scope of the present invention. Thus, instead of a 2P layer 2 a material may be used which can deformed by heating at the location of contact with the cylinder 10 and which retains this deformation after cooling. In addition, the method in accordance with the invention can be adapted to replicate magnetic structures 7. The write head 17 then comprises one or more magnetic heads and the circumferential surface 11 of the cylinder 10 and the intermediate carrier 1 are provided with a magnetisable layer.

We claim:

1. A method of manufacturing tape-like information carriers, comprising the following steps:

forming a helical pattern on a circumferential surface of a cylinder, and bringing the circumferential surface of the cylinder having the helical pattern into contact with a main surface of a web-shaped intermediate carrier with a longitudinal direction, in a manner effective to replicate the helical pattern on the intermediate carrier in the form of continuous strips, which strips extend at an acute angle (α) relative to the longitudinal direction, wherein the helical pattern comprises a first structure with coded information, and after said contact of said cylinder with said intermediate carrier, a second structure is formed in each of the strips, which second structure is a replica of the first structure, and wherein the intermediate carrier is cut parallel to the strips so as to form tape-like information carriers.

2. A method as claimed in claim 1, wherein the pattern is formed on the cylinder by means of a write head while the cylinder is rotated relative to the write head about an axis and the write head is moved relative to the cylinder in a direction parallel to the axis.

3. A method as claimed in claim 2, wherein the second structure takes the form of an optically readable structure.

4. A method as claimed in claim 2, in which cutting is effected at cutting positions, and wherein the positions of the strips relative to the cutting positions are measured during cutting, and in that the measurement result is used for the correction of these positions.

5. A cassette comprising two reel hubs, wherein an information carrier obtained by means of the method as claimed in claim 2 is wound on at least one of the reel hubs.

6. A method as claimed in claim 1, wherein the second structure takes the form of an optically readable structure.

7. A method as claimed in claim 6, in which cutting is effected at cutting positions, and wherein the positions of the strips relative to the cutting positions are measured during cutting, and the measurement result is used for the correction of these positions.

8. A cassette comprising two reel hubs, wherein an information carrier obtained by means of the method as claimed in claim 6 is wound on at least one of the reel hubs.

9. A method as claimed in claim 1, in which cutting is effected at cutting positions, and wherein the positions of the strips relative to the cutting positions are measured during cutting, and the measurement result is used for the correction of these positions.

10. A method as claimed in claim 9, wherein correction of the positions is effected by controlling the tension in the intermediate carrier.

11. A cassette comprising two reel hubs, wherein an information carrier obtained by means of the method as claimed in claim 10 is wound on at least one of the reel hubs.

12. A cassette comprising two reel hubs, wherein an information carrier obtained by means of the method as claimed in claim 9 is wound on at least one of the reel hubs.

13. A tape-like information carrier obtained by means of the method as claimed in claim 1.

14. A cassette comprising two reel hubs, wherein an information-carrier obtained by means of the method as claimed in claim 1 is wound on at least one of the reel hubs.

15. A web-like intermediate carrier with a longitudinal direction, comprising strips which extend at an acute angle (α) relative to the longitudinal direction and form tape-like information carriers when the web-like intermediate carrier is cut parallel thereto, wherein the strips have mutually identical second structures containing coded information formed therein, and wherein the second structures are replicas of first structures containing coded information.

16. A web-like intermediate carrier as claimed in claim 15, wherein the acute angle (α) is smaller than 5 degrees.

17. A web-like intermediate carrier as claimed in claim 16, wherein the second structure is optically readable.

18. A web-like intermediate carrier as claimed in claim 15, wherein the second structure is optically readable.

* * * * *